March 10, 1942. M. A. BOSTWICK 2,275,941
PILOT-CHANNEL PROTECTIVE RELAYING SYSTEM
Filed Aug. 3, 1940

WITNESSES:

INVENTOR
Myron A. Bostwick.
BY
ATTORNEY

Patented Mar. 10, 1942

2,275,941

UNITED STATES PATENT OFFICE 2,275,941

PILOT-CHANNEL PROTECTIVE RELAYING SYSTEM

Myron A. Bostwick, Budd Lake, N. J., assignor to Westinghouse Electric & Manufacturing Company, East Pittsburgh, Pa., a corporation of Pennsylvania Application August 3, 1940, Serial No. 350,658

33 Claims. (Cl. 175—294)

My invention relates to protective relaying systems such as are employed for protective transmission-line sections, or other protected electrical apparatus, against faults, and for similar purposes, and it has particular relation to such systems utilizing a pilot-channel or communicating-channel for obtaining a current from some other point in the transmission line for assisting in protecting the line-section against internal faults while blocking or avoiding a line-segregating or sectionalizing operation of a circuit-breaker in the event of a transmission-line fault occurring beyond said other point, by which I mean that, in a current-comparing or other relaying system which makes use of a line-current derived from said other point, a circuit breaker tripping-operation is blocked or prevented in the event of any external fault outside of the protected line-section or apparatus, without necessarily limiting myself to the case in which the derived "other-point" current is used to prevent or restrain a relay-response. The communicating channel may be either a pair of pilot wires, or a tuned high-frequency carrier-current circuit, or any other means whereby intelligence or a signal-current-change may be communicated from one point to another.

One object of my invention is to provide an intermittent carrier-current protective system in which the communicating channel includes a normally non-transmitting high-frequency transmitter, characterized by having means for controlling a certain transmitter in response to any one of a plurality of different kinds of fault on the transmission system, such as phase-to-phase faults on any delta phase, phase-to-ground faults on any line-to-ground phase or on any pair of line-to-ground phases, or three-phase short-circuits.

A more specific object of my invention is to provide a phase-sequence-responsive pilot-channel protective-means for responding to any one of a plurality of different kinds of fault on a polyphase transmission-line, utilizing a carrier-current pilot-channel, and utilizing a voltage-limiting means, not only at the relaying point, for limiting the special phase-sequence-responsive quantity, which is utilized in the energization of the tripping relay at the relaying point, but also in the control of the carrier-current transmitter and in the control of the output of the carrier-current receiver.

A further object of my invention is to provide a carrier-current pilot-channel-responsive tripping-relay for comparatively responding, in a novel manner, to both a relaying quantity which is derived from a line-current function at the relaying point and a relaying quantity which is derived from a line-current function at some other point in the transmission line. More specifically, my invention relates to a response to some function of the relative phases of two such relaying quantities, substantially regardless of their magnitudes.

A further object of my invention is to provide a novel square-topped-wave transformer having a time-constant such that the magnetizing current through the primary circuit of the transformer will build up continuously at a fairly constant rate over an entire half-cycle of the alternating-current supply to the transformer, and to provide means for utilizing such a transformer in the control or modulation of a high-frequency carrier-current transmitter in a protective system for transmission lines.

A still further object of my invention is to provide a pilot-channel protective relaying-system, utilizing either a pair of pilot wires, or carrier current, or any other sort of communicating-channel, for obtaining a line-current-responsive relaying-current from some other point in the protected line-section for assisting in blocking a tripping operation at the relaying point in the event of a line-fault beyond said other point, with fault-detector means for causing the relaying-current to be sent from said other point to the tripping point only in the event of the occurrence of predetermined line-fault conditions, and with safeguards for preventing a faulty tripping-operation prior to the sending of said relaying-current from said other point.

A still further object of my invention is to utilize a polarized relay as the phase-comparing relay, or, in general, a relay which responds (in a certain operating-time of the relay), when the relaying quantity derived from the line-current at the relaying point is not shunted out of the operating-coil of the relay by reason of a substantially in-phase quantity derived from a line-current at the other point from which a line-responsive current is obtained, or when the line-responsive currents which are derived from the two ends of the protected line-section are not substantially in phase with each other.

With the foregoing and other objects in view, my invention consists in the apparatus, combinations, systems and methods hereinafter described and claimed, and illustrated in the accompanying drawing, the single figure of which is a very much simplified diagrammatic view of circuits and apparatus embodying my invention in one exemplary form of embodiment which is intended to be representative of the general principles which have been hereinabove discussed, and which will be referred to in the more detailed description hereinafter.

Figure 1:
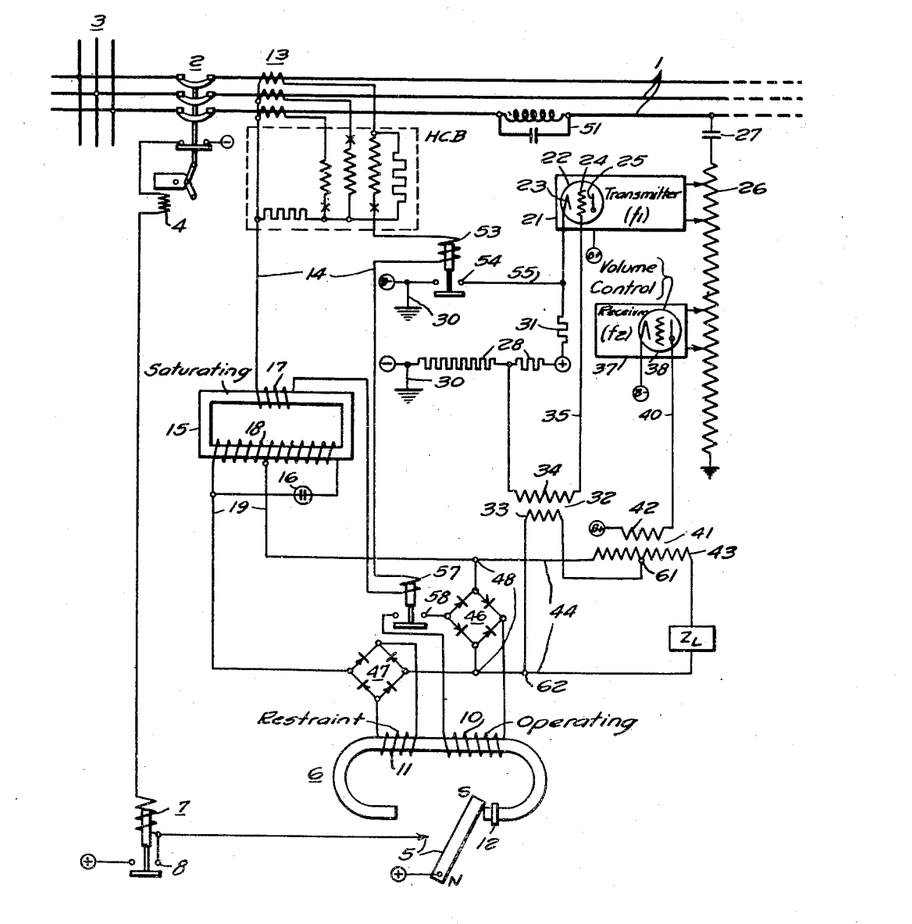

I have illustrated my invention in connection with a three-phase transmission-line section, a single end of which is indicated at 1 in the drawing. It is believed that a showing of the protective apparatus at one end of the protected line-section 1 will suffice for both ends, as the protective apparatus at the two ends of the protected line-section are, or may be, identical with each other, except for the matter of the tuning-adjustment of the frequencies $f_1$ and $f_2$ of the carrier-current transmitter and receiver, the frequencies of which are reversed, at the two ends of the line-section, as will be subsequently described.

The illustrated terminal of the protected line-section 1 is shown as being provided with a circuit-breaker 2, or other line-segregating circuit-interrupting means for disconnecting the line from other apparatus, such as a bus 3. The circuit-breaker 2 is illustrated as having a trip-coil 4, or equivalent breaker-controlling means, which is energized by the closure of a relay-contact 5 of an electro-responsive tripping relay 6. The tripping circuit for energizing the trip-coil 4 is shown as being provided with an auxiliary relay 7 having a make-contact 8 which bypasses the tripping-relay contacts 5 as soon as the trip-circuit is momentarily energized by a closure of the tripping-contacts 5. In the preferred or exemplary form of embodiment of my invention, which is shown in the drawing, the tripping relay 6 is a polarized relay having a many-turn operating-winding 10, a few-turn restraint-winding 11, and also (usually) a short-circuiting or eddy-current ring 12 which is utilized to control the speed of response of the relay, so that it will not chatter too quickly in response to unimportant alternations or pulsations of the current in the windings 10 and 11, the relay being adjusted to have a responding-time of some reasonable value, such as one full cycle, or more, of the line-frequency current, or other predetermined operating-time.

The preferred form of embodiment of my invention, which is illustrated in the drawing, is an adaptation of the phase-sequence-responsive pilot-channel relaying-system which is shown, described and claimed in a Harder Patent No. 2,183,646, granted December 19, 1939, and assigned to the Westinghouse Electric & Manufacturing Company. According to this Harder system, a special combination of positive and zero phase-sequence responses to the polyphase line-current is utilized at each end of the protected line-section for deriving a single-phase relaying quantity at each end of the protected line-section, and these relaying quantities, derived from the two ends, are compared, with the aid of a pilot-wire communicating-channel, so as to jointly energize a tripping-relay such as the polarized relay which I have illustrated at 6. In accordance with one aspect of my invention, I have adapted this Harder system to be applicable to a pilot-channel consisting of a carrier-current transmitter, at one end, and a carrier-current receiver, at the other end, in a manner which will now be more particularly described.

At each end of the protected line-section 1, I utilize a bank of line-current transformers 13 to energize a polyphase-responsive phase-sequence network HCB, which may be similar to the particular network which is described in the aforesaid Harder patent, or which may be any phase-sequence-responsive means which responds to a composite phase-sequence function made up of two or more selected phase-sequence quantities, and which develops a single-phase electrical quantity having an approximation toward a constant predetermined magnitude for any one of a number of approximately equally severe different possible faults or fault-combinations on the transmission line. By "approximately equally severe" I mean to refer more particularly to faults which are located at approximately the same distance from the relaying point, but which may be either single-phase, double-phase, polyphase, line-to-line, or ground-faults.

In a more generic sense, my illustrated network HCB may be regarded as representative of any means for affording a predetermined fault-indication of the same sensitivity for any one of a plurality of types of faults of different kinds, whether the difference in kind relates to the faults occurring on different ones of the line-phases, or in a difference between the line-to-line faults and line-to-ground faults. In the broadest sense, the illustrated fault-responsive network HCB may be regarded as representative of a means for deriving a single-phase relaying-voltage which attains a magnitude varying in accordance with the severity (or distance of the fault), but which relaying-voltage attains approximately the same voltage (or a voltage which is equal to, or in excess of, a required minimum relay-operating voltage), for any given line-fault severity (or distance) regardless of what kind of fault it is.

The output of the selective phase-sequence network HCB, or equivalent fault-responsive device, is obtained in a single-phase output-circuit 14 which is preferably utilized in connection with a suitable voltage-limiting means which is illustrated in the form of a saturating transformer 15 and a neon tube 16, although either one of these means could be utilized by itself, or any other suitable voltage-limiting means could be utilized, or omitted altogether. The particular voltage-limiting means which is illustrated is that which is described and claimed in a Bostwick Patent No. 2,183,537, granted December 19, 1939, and assigned to the Westinghouse Electric & Manufacturing Company. In this voltage-limiting means, the voltage of the network-output circuit 14 is supplied to the primary winding 17 of the saturating transformer 15, and the secondary winding 18 is shunted by the neon tube 16, or other voltage-limiting space-current discharge-tube, a portion of the secondary voltage being tapped off to provide a local relaying-current circuit 19 in which an electrical magnitude, such as a limited voltage, is produced, having a magnitude which increases relatively slowly with increases in the line-current beyond a certain predetermined point, depending upon the point at which it is desired to secure a discriminatory fault-responsive relaying-operation, which is capable of discriminating a fault-condition from a normal full-load-current condition on the line 1.

In accordance with my invention, the derived relaying-voltage which is obtained in the output-circuit 19, in some predetermined response to the line-current at the relaying point containing the circuit-breaker 2 at the illustrated end of the line-section, is utilized to control, or modulate, a high - frequency carrier - current transmitter which is illustrated schematically at 21. The transmitter 21 is illustrated as comprising an oscillator-tube 22 having a cathode 23, a grid 24 and an anode 25, for developing a carrier current of a high frequency $f_1$, which is superimposed upon one of the phases of the line 1 by means of a coupling transformer 26 and a coupling capacitor 27. The transmitter receives its energy from a suitable direct-current source such as a B-battery which is indicated by its terminals (B−) and (B+).

Any suitable transmitter-controlling or modulating arrangement can be utilized. The illustrated means, to this end, is in the form of means for normally biasing the oscillator-grid 24 to a negative voltage with respect to the cathode 23, and means for altering said bias by means of a voltage derived from the relaying circuit 19. The normal direct-current grid-bias is illustrated as being supplied by a potentiometer 28 which derives its voltage from a station-battery which is indicated by the terminals (+) and (−), the positive terminal (+) of the station-battery being connected to the cathode 23 of the transmitter-oscillator, so that a negative bias can be applied to the grid 24. In order to make it possible to ground the negative terminals (B−) and (−) of both the B-battery and the station-battery, as indicated at 30, I prefer to utilize a resistor 31 in the connection between the oscillator-cathode 23 and the positive terminal (+) of the station-battery.

The modulation of the transmitter-output or operation, in response to the relaying quantity or voltage which is obtained in the output-circuit 19 of the fault-responsive means at the illustrated station, takes the form of a special flat-wave-output transformer 32 having a primary winding 33 which is energized from the circuit 19, either in shunt-circuit relation thereto, as illustrated, or in series-circuit relation thereto. The details of the energizing-circuit for the primary winding 33 will be described more in detail near the close of this specification. The transmitter-controlling transformer 32 has a secondary winding 34 which is connected in series with the grid-circuit 35 which controls the potential of the oscillator-grid 24, so that the grid is periodically caused to be positive, with respect to the potential of the oscillator-cathode 23, in response to a predetermined magnitude, and alternate half-cycles, of the voltage appearing in the relaying circuit 19, so that the transmitter 21 is caused to operate in a series of pulsations which respond, in time-phase, to the alternating-current relaying-quantity which is derived in the output-circuit 14 of the HCB network.

It is desired that the output of the transmitter-controlling transformer 32 shall be a substantially flat-topped rectangular wave made up of a plurality of voltage-impulses, in opposite directions, which suddenly increase to substantially their full maximum value, at the very beginning of each half-cycle, and which maintain approximately a constant value until substantially the very end of that half-cycle, at which time the voltage quickly reduces to zero and reverses for the next half-cycle. In order to satisfy this object, I have found that it is merely necessary to design the transformer 32 so that the transformer, or its primary circuit, has a time-constant such that the magnetizing-current through the primary circuit of the transformer will build up continuously at a fairly constant rate over an entire half-cycle of the alternating-current voltage which is applied thereto, that is to say, over an entire half-cycle of the magnetizing-current thereof. The approximately constant-voltage regulation of the output-circuit 19 from which the transformer 32 is energized makes it easier to design the transformer 32 so that its time-constant has the required magnitude throughout the approximately constant-voltage range of the relaying quantity which is obtained in the output-circuit 19.

At each end of the illustrated protective system, I also provide a carrier-current receiver 37 which is also coupled to the coupling transformer 26, and which is provided with an output amplifier-tube 38 which is preferably of the well-known volume-control type, or otherwise associated with current- or voltage-limiting means for limiting the magnitude of the response to the received wave, substantially regardless of the amount of high-frequency current which is received by the receiver. The output amplifier-tube 38 delivers its output in the form of a pulsating unidirectional wave which is delivered by the plate-circuit 40 of the receiver, said plate-circuit having a current which varies between a substantially constant top-value and substantially zero, depending upon whether any carrier-current is received at the frequency to which the receiver is attuned.

The receiver 37 at the illustrated station, at one end of the protected line-section 1, is tuned to the same frequency as the transmitter at the other end of the protected line-section, only the one end being illustrated, as the equipments at the two ends are identical, except for the matter of tuning. The receiver 37 at the illustrated or relaying end is tuned to the same frequency $f_2$ as the transmitter at the remote end, and in like manner the receiver at the remote end is tuned to the same frequency $f_1$ as the transmitter 21 at the relaying end. These two frequencies are sufficiently different from each other to provide for a suitable amount of selectivity so as to properly discriminate between the signals sent from the opposite ends of the protected line-section, so that each receiver responds, not in magnitude, but in time-phase relation, to the alterations of the single-phase electrical relaying quantity which was utilized for controlling or modulating the transmitter at the other end of the line-section in response to a predetermined line-current function at said other end.

The plate-current output-circuit 40 of the receiver 37—38 is provided with means for deriving a flat-topped alternating-current wave which is responsive to the pulsations in said plate-circuit 40. The means which I have illustrated for this purpose comprises a transformer 41 having a primary winding 42 which is connected in the plate-circuit 40, and a secondary winding 43 which is connected to an alternating-current output-circuit 44 in which a limited-magnitude voltage, or other electrical quantity, is produced, having a predetermined time-phase response to a predetermined line-current function at the other end of the protected line-section. Since the primary current in the transformer 41 is unidirectional direct current, with pulsations, and since this current is supplied to the primary winding 42 of the transformer, it will be necessary for said transformer to have an air-gap in its magnetic circuit, in order to avoid direct-current saturation, as will be readily understood by those skilled in the art.

The two output-circuits 19 and 44 thus constitute two circuits having electrical relaying-quantities therein, which are more or less fixed in magnitude, but which have time-phases which are responsive, in some measure, to the time-phases of two single-phase alternating-current quantities which are derived from the line-currents at the respective ends of the protected line-section. By the description "limited magnitude", I do not mean an absolutely fixed magnitude, but simply a quantity which does not change, in magnitude, anywhere nearly as fast as the derived alternating current to which it responds, such as the derived alternating current in the output-circuit 14 of the HCB network, after a certain predetermined magnitude has once been reached. The output of the voltage-limiting means 15 and 16 which is associated with the fault-responsive network HCB is sometimes a roughly approximately sinusoidal wave-form, but at higher fault-current magnitudes, the output wave-form in the circuit 19 becomes decidedly flat-topped in its shape.

The limited-magnitude relaying-quantities which are contained in the two output-circuits 19 and 44 are compared in the same manner that the corresponding quantities are compared in the pilot-wire relaying system of the above-mentioned Harder patent, the essential difference being that the relaying-quantity in the output-circuit 44 is obtained in accordance with a predetermined response to line-current conditions at the other end of the protected line-section through the medium of a carrier-current transmitter at said other end, and an attuned volume-controlling carrier-current receiver 37 at the relaying end of the protected line-section.

Thus the operating coil 10 of the tripping-relay 6 is energized so as to be differentially responsive to the relaying-voltages contained in the two output-circuits 19 and 44, and since the tripping-relay 6 is a polarized relay, the operating coil 10 must be energized from said differential alternating-current function through a rectifier 46 which is illustrated as a full-wave rectifier-bridge which may be composed of contact-rectifiers of low current-carrying capacity. The restraint-winding 11 of the tripping-relay 6 is energized so as to be responsive to the alternating current which is circulated through the two output-circuits 19 and 44 in proportion to the sum of the two voltages delivered by the transformer windings 18 and 43, and hence (as a result of the symmetry of the circuit), in proportion to the current delivered by the local output-circuit 19. Like the operating coil 10, the restraint-coil 11 is energized from said alternating-current circuit, through a rectifier-bridge 47, substantially as is described in the aforesaid patents.

The two HCB networks, at the opposite ends of the protected line-section, together with their associated line-current transformers 13, are energized so as to be both responsive to the current flowing into the protected line-section from its bus 3 or other apparatus to which that end of the line-section is connected. Consequently, when current is flowing into the protected line-section at one end, and out of the protected line-section at the other end, as in the case of a fault located beyond said other end, the relaying voltages of the two output-circuits 19 and 44 are in phase-opposition to each other, so that an in-phase or circulating current is passed through the circuits 19 and 44, resulting in a substantially zero potential-drop across the alternating-current terminals 43 of the rectifier 46. This circulating current is effectively shunted out of the operating-winding 10 of the tripping-relay 6, and since it flows through the restraining-winding 11 it blocks relay-operation. Under these circumstances, the tripping-relay 6 does not respond.

In the event, however, of a fault within the protected line-section 1, current is delivered to said fault at the illustrated end of the line-section, and any current which is delivered to the fault from the other end of the line-section will be approximately 180° out of the phase with the current-conditions which existed when the fault was beyond the far end of the protected line-section. If sufficient fault-current flows, at the far end of the line-section, to actuate the carrier-current transmitter at said far end, the receiver 37 at the relaying point will receive a current such as to produce a relaying-voltage, in the output-circuit 44, which is substantially or approximately in phase with the relaying-voltage of the locally-responsive output-circuit 19. Under these circumstances, the full output-voltage of the two output-circuits 19 and 44 will be applied across the rectifier-terminals 43 of the operating-winding 10, and the relay 6 will be quickly actuated to its actuated position in which the relay-contact 5 is closed. The operating-winding 10 has many more turns than the restraining-winding 11, so that the restraint of the restraining-winding 11 is much too small to prevent operation of the tripping-relay 6 under these circumstances.

In case, however, the fault-current which is supplied, at the far end of the protected line-section, to an internal fault (that is, to a fault within the limits of the protected line-section 1), is too small to produce a carrier-current transmitter-controlling response at said far end, then the relaying-voltage which appears in the remote-responsive output-circuit 44 at the relaying point will be zero, with the result that practically all of the current which is supplied by the locally-responsive output-circuit 19 will be delivered to the rectifier 46 which supplies the operating-winding 10 of the tripping-relay 6, only a small magnetizing-current being diverted from said rectifier 6, to be passed through the secondary winding 43 of the transformer 41. In this case also, due to the much larger number of turns in the operating-winding 10 than in the restraint-winding 11, the tripping-relay 6 will be quickly actuated, so as to close its tripping-contacts 5 and effect a line-segregating or circuit-opening operation of the circuit-breaker 2.

As will be evident from the foregoing explanation, and as is also further explained in the aforementioned Harder patent, the response of the polarized tripping-relay 6 is, in one sense, substantially a phase-response or directional-response, to the electrical relaying quantities in the two output-circuits 19 and 44 which are respectively responsive to line-current conditions at opposite ends of the protected line-section, and I desire my illustration and explanation of my invention to be broadly indicative of the utilization of any equivalent phase-responsive mechanism.

The carrier-current pilot-channel is confined to the coupled phase of the line-section 1, that is, to the phase-conductor to which the coupling-capacitors 27 are connected at the respective ends of the line-section, by means of line-connected wave-traps 51, these wave-traps being double-frequency wave-traps which are tuned so as to impede the flow of currents of both of the frequencies $f_1$ and $f_2$, or if these frequencies are sufficiently close together, a broadly tuned single-frequency wave-trap 51 may be utilized.

It is usually desirable to utilize what is known as an intermittent type of carrier-current system, in which the transmitters 21 at the respective ends of the protected line-section are normally in a non-transmitting condition, and are caused to transmit carrier current into the carrier-current channel only in response to line-fault conditions. Under such circumstances, it is necessary for the tripping-relay 6 to be arranged so as to be sufficiently insensitive, or to be otherwise adapted or controlled, so that it will not operate on normal fault-free line-current conditions. Thus, when the line-current attains fault-magnitude, the carrier-current transmitter at the far end of the line-section is brought into play, so that a blocking alternating-current quantity may be obtained from the remotely-responsive output-circuit 44, so as to block the energization of the operating-winding 10 in the event of a transmission-line fault beyond the remote end of the protected line-section. This blocking-current must become effective before the response of the tripping-relay 6 to the locally-responsive relaying quantity in the local output-circuit 19 has attained a sufficient magnitude to cause a tripping-operation.

In the form of my invention utilizing the grid-biasing potentiometer 28, the relative values of the negative grid-bias and the voltage induced in the secondary winding 34 of the transmitter-controlling transformer 32 may be so chosen that the carrier-current transmission begins to occur on positive half-cycles, or during positive half-cycles of the locally-responsive relaying-quantity which is obtained in the output-circuit 19, at smaller voltage-magnitudes than the voltage-magnitude necessary to cause an operation of the tripping-relay 6 in the absence of a blocking signal received over the remotely controlled output-circuit 44. It should be remembered that, while the limited-voltage output of the circuit 19 is limited in its magnitude, it is not, in any practical system, by any means constant, in its magnitude, after the line-current function has attained a certain predetermined magnitude, and hence these voltage-discriminating functions can be obtained.

It is frequently preferable, however, to utilize a separate sensitive fault-detector 53 which is illustrated in the form of a relay having its operating-coil connected in series with the HCB output-circuit 14, and having a make-contact 54 which is illustrated as being connected in series with the cathode-circuit 55 of the oscillator 22, that is, between the cathode 23 and the negative terminal (B—) of the B-battery.

It may be also preferable, or advantageous, to utilize a second fault-detector 57, which is less sensitive than the transmission-initiating fault-detector 53, and having an operating coil which is also connected in series with the HCB output-circuit 14. The less sensitive fault-detector 57 may have a make-contact 58 which is connected in series with the operating-winding 10 of the tripping-relay, or in series with the rectifier 46 which energizes the same, so as to avoid any possibility of tripping prior to the attainment of an alternating current of a predetermined fault-magnitude in the output-circuit 14 of the line-current-responsive network HCB.

In view of the fact that the limited-voltage output-circuit 19 ordinarily does not have an absolutely fixed upper voltage-limit, but increases its voltage, say, by 100%, when the line-current increases, say, by 2000%, it would be feasible for the fault-detectors 53 and 57 to be energized responsively to the limited-voltage output-circuit 19 rather than the line-current-responsive output-circuit 14.

The utilization of the fault-detectors 53 and 57 makes it unnecessary and undesirable to rely upon sensitive adjustments of the oscillator grid-bias or of the sensitivity of the tripping relay to accomplish the functions which are accomplished by said fault-detectors 53 and 57. It is necessary for the transmitter-starting fault-detector 53 to be more sensitive than the tripping-controlling fault-detector 57, so as to make sure that there is always a blocking current available in the remotely-responsive output-circuit 44 under all conditions whenever there may be a line-fault beyond the far end of the protected line-section.

The above-described intermittent-carrier comparative-current relaying system possesses an important advantage during system-operating conditions in which line-current of fault-magnitude is supplied to an internal line-fault from only one end of the protected line-section. Under such conditions, assuming, for example, that fault-current is being supplied at the illustrated end of the line-section, but not at the other end thereof, it will be noted that the receiver-energized transformer 41 will not develop a voltage which is substantially equal and opposite to the local relaying-voltage produced in the output-circuit 19 of the locally energized saturating transformer 15. Normally, the opposed received relaying-voltage, in the output-circuit 44 of the receiver-energized transformer 41, operates, during doubly-fed internal line-fault conditions, to cause all of the relaying current to be passed through the rectifier-bridge 46 which energizes the operating winding 10 of the fault-responsive tripping-relay 6. My normally non-transmitting carrier-current transmitter 21, which is set into operation only in response to line-current of fault-magnitude at the station where it is located, has the advantage, therefore, of interrupting the communicating pilot channel, or carrier-current transmission from the far end to the illustrated local end, under circumstances when no fault-current is being supplied to a faulted line-section at the far end, thus reducing the diversion of the relaying-current from the operating-coil rectifier-bridge 46 to the pilot-channel, as has commonly been experienced heretofore in ordinary two-wire pilot circuits, not utilizing carrier. It will readily be apparent that any diversion of current from the operating coil 10 of the tripping relay 6 desensitizes said relay and makes said relay fail to operate at relatively small values of the fault-current.

It will be noted that the primary winding 33 of the transmitter-controlling transformer 32 is so energized as to be responsive to the voltage in the output-circuit 19 of the local fault-responsive means at the illustrated station, but it is non-responsively energized with respect to the output-circuit 44 of the receiver 37. In order to apply none of the receiver-output voltage to the primary winding 33 of the transmitter-controlling transformer 32, one of the energizing-leads of said primary winding 33 is connected to the mid-point 61 of the secondary winding 43 of the receiver-output transformer 41; and the output-circuit 44 of said secondary winding 43 is provided with a dummy impedance $Z_L$, matching the impedances of the network HCB, the local voltage-limiting devices 15—16, and the windings of the fault-responsive relay 6. The dummy impedance $Z_L$ cooperates with the mid-point 61 of the transformer secondary 43 to provide another "electrical center" or portion 62 in the circuit 44, such that the voltage appearing in the secondary winding 43 always produces a zero voltage-drop or potential-difference between the two points 61 and 62. The second terminal-lead of the primary winding 33 is connected to said point 62, so that the transmitter-controlling transformer 32 will respond to the voltage of the locally energized output-circuit 19, but not at all to the voltage of the receiver-energized transformer 41. It is usually desirable to provide some such feedback-preventing means for preventing the line frequency output of the receiver 37 from initiating carrier-current transmission through the coupling between the two output-circuits 19 and 44.

While I have illustrated my invention in a single preferred form of embodiment, and while I have described its principles of operation in accordance with my best present understanding of the invention, I desire that such illustration and description be taken in an illustrative sense rather than altogether in a limiting sense, as various changes and substitutions may be made by those skilled in the art without departing from the essential spirit of my invention. I desire, therefore, that the appended claims shall be accorded the broadest construction consistent with their language and the prior art.

I claim as my invention:

1. The combination, with a polyphase transmission-line section to be protected, and line-segregating circuit-interrupting means for disconnecting the line from other apparatus, of line-fault-responsive relaying-means for actuating said line-segregating circuit-interrupting means so as to effect a disconnecting operation, said line-fault-responsive relaying-means including communicating-channel means for obtaining a current from some other point in the transmission line than said line-fault-responsive relaying-means for assisting in protecting the line-section against internal faults while avoiding a line-segregating operation in the event of a transmission-line fault occurring beyond said other point; said communicating-channel means including a normally non-transmitting high-frequency transmitter at said other point in the transmission line, an attuned high-frequency receiver at said relaying point, and transmitter-controlling means at said other point; characterized by said transmitter-controlling means including a line-fault-responsive means so coupled to the line at said other point as to respond to a composite phase-sequence function of the line-current and so as to produce a single relaying-quantity which attains substantially a predetermined magnitude in response to any one of a number of approximately equally severe different possible faults or fault-combinations, and a single transmitter-starting means responsive, in some measure, to said predetermined magnitude.

2. The combination, with a polyphase transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means including communicating-channel means for obtaining a current from some other point in the transmission line than said line-fault-responsive relaying means for assisting in protecting the line-section against internal faults while avoiding a line-segregating operation in the event of a transmission-line fault occurring beyond said other point; said communicating-channel means including a normally non-transmitting high-frequency transmitter at said other point in the transmission line, an attuned high-frequency receiver at said relaying point, and transmitter-controlling means at said other point; characterized by said transmitter-controlling means including a phase-sequence means so coupled to the line at said other point as to respond, in some measure, to a plurality of phase-sequence components of the polyphase line-current in such proportions and combinations as to develop a single-phase electrical quantity having an approximation toward a constant predetermined magnitude for any one of a number of approximately equally severe different possible faults or fault-combinations, and a single transmitter-starting means responsive, in some measure to said predetermined magnitude.

3. The combination, with a three-phase transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means including communicating-channel means for obtaining a current from some other point in the transmission line than said line-fault-responsive relaying-means for assisting in protecting the line-section against internal faults while avoiding a line-segregating operation in the event of a transmission-line fault occurring beyond said other point; said communicating-channel means including a normally non-transmitting high-frequency transmitter at said other point in the transmission line, an attuned high-frequency receiver at said relaying point, and transmitter-controlling means at said other point; characterized by said transmitter-controlling means including a polyphase-responsive transmitter-starting fault-detecting relay-element selectively responsive to both the positive-sequence and zero-sequence components of a three-phase line-current at said other point in such proportions and combinations as to sufficiently closely approximate the same sensitivity to any one of a number of different possible faults or fault-combinations.

4. The combination, with a polyphase transmission-line section to be protected, and line-segregating circuit-interrupting means for disconnecting the line from other apparatus, of line-fault-responsive relaying-means for actuating said line-segregating circuit-interrupting means so as to effect a disconnecting operation, said line-fault-responsive relaying-means including communicating-channel means for obtaining a current from some other point in the transmission line than said line-fault-responsive relaying-means for assisting in protecting the line-section against internal faults while avoiding a line-segregating operation in the event of a transmission-line fault occurring beyond said other point; said communicating-channel means including a high-frequency transmitter at said other point in the transmission line, an attuned high-frequency receiver at said relaying point, and transmitter-controlling means at said other point; characterized by said transmitter-controlling means including a line-fault-responsive means so coupled to the line at said other point as to respond to a composite phase-sequence function of the line-current and so as to produce a single relaying-quantity which attains substantially a predetermined magnitude in response to any one of a number of approximately equally severe different possible faults or fault-combinations, and a transmitter-controlling means responsive, in some measure, to said predetermined magnitude.

5. The combination, with a polyphase transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means including communicating-channel means for obtaining a current from some other point in the transmission line than said line-fault-responsive relaying-means for assisting in protecting the line-section against internal faults while avoiding a line-segregating operation in the event of a transmission-line fault occurring beyond said other point; said communicating-channel means including a high-frequency transmitter at said other point in the transmission line, an attuned high-frequency receiver at said relaying point, and transmitter-controlling means at said other point; characterized by said transmitter-controlling means including a phase-sequence means so coupled to the line at said other point as to respond, in some measure, to a plurality of phase-sequence components of the polyphase line-current in such proportions and combinations as to develop a single-phase electrical quantity having an approximation toward a constant predetermined magnitude for any one of a number of approximately equally severe different possible faults or fault-combinations, and a transmitter-controlling means responsive, in some measure to said predetermined magnitude.

6. The combination, with a three-phase transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means including communicating-channel means for obtaining a current from some other point in the transmission line than said line-fault-responsive relaying means for assisting in protecting the line-section against internal faults while avoiding a line-segregating operation in the event of a transmission-line fault occurring beyond said other point; said communicating-channel means including a high-frequency transmitter at said other point in the transmission line, an attuned high-frequency receiver at said relaying point, and transmitter-controlling means at said other point; characterized by said transmitter-controlling means including a polyphase-responsive relay-element selectively responsive to both the positive-sequence and zero-sequence components of a three-phase line-current at said other point in such proportions and combinations as to sufficiently closely approximate the same sensitivity to any one of a number of different possible faults or fault-combinations.

7. The combination, with an alternating-current transmission-line section to be protected, and line-segregating circuit-interrupting means for disconnecting the line from other apparatus, of line-fault responsive relaying-means for actuating said line-segregating circuit-interrupting means so as to effect a disconnecting operation; said line-fault-responsive relaying-means including communicating-channel means for obtaining a current from some other point in the transmission line than said line-fault-responsive relaying-means for assisting in protecting the line-section against internal faults while avoiding a line-segregating operation in the event of a transmission-line fault occurring beyond said other point; said communicating-channel means including a high-frequency transmitter at said other point in the transmission line, an attuned high-frequency receiver at said relaying point, and transmitter-controlling means at said other point; characterized by said transmitter-controlling means including a current-responsive means so coupled to the line at said other point as to respond, in some measure, to a line-current at said other point so as to derive an electrical quantity, and a transformer having a primary circuit energized so as to be responsive, in some measure, to said electrical quantity, said transformer having a secondary circuit so coupled to the transmitter as to effect some measure of control thereover, and said transformer having a time-constant such that the magnetizing current through the primary circuit of the transformer will build up continuously at a fairly constant rate over an entire half-cycle of said electrical quantity over a predetermined range of values of said electrical quantity.

8. The combination, with an alternating-current transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault responsive relaying-means including communicating-channel means for obtaining a current from some other point in the transmission line than said line-fault-responsive relaying-means for assisting in protecting the line-section against internal faults while avoiding a line-segregating operation in the event of a transmission-line fault occurring beyond said other point; said communicating-channel means including a high-frequency transmitter at said other point in the transmission line, an attuned high-frequency receiver at said relaying point, and transmitter-controlling means at said other point, characterized by said transmitter-controlling means including a current-limiting means so coupled to the line at said other point as to respond, in some measure, to a line-current at said other point so as to derive an electrical quantity having, at times, a somewhat flat-topped wave-form, and a transformer having a primary circuit energized so as to be responsive, in some measure, to said electrical quantity, said transformer having a secondary circuit so coupled to the transmitter as to effect some measure of control thereover, and said transformer having a time-constant such that the magnetizing current through the primary circuit of the transformer will build up continuously at a fairly constant rate over an entire half-cycle of said electrical quantity.

9. The combination, with an alternating-current transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means being of a type which utilizes a current obtained from some other point in the transmission line than said line-fault-responsive relaying-means for assisting in protecting the line-section against internal faults while avoiding a line-segregating operation in the event of a transmission-line fault occurring beyond said other point; characterized by said line-fault-responsive relaying-means comprising a current-limiting means so coupled to the line at the relaying point as to respond, in some measure, to a line-current at the relaying point so as to derive an electrical quantity having, at times, a somewhat flat-topped wave-form, a high-frequency transmitter at said other point in the transmission line, an attuned high-frequency receiver at said relaying point, and transmitter-controlling means at said other point; said transmitter-controlling means including a current-limiting means so coupled to the line at said other point as to respond, in some measure, to a line-current at said other point so as to derive an electrical quantity having, at times, a somewhat flat-topped wave-form, means responsive, in some measure, to said electrical quantity at said other point and so coupled to the transmitter as to effect some measure of control thereover, said receiver at the relaying point including a current-limiting means for producing an electrical quantity having, at times, a somewhat flat-topped wave-form in response, in some measure, to the electrical quantity at said other point, and electro-responsive means at the relaying point for comparatively responding, in some measure, to both of said electrical quantities at said relaying point, to effect a predetermined control over the line-segregating circuit-interrupting means.

10. The combination, with an alternating-current transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means being of a type which utilizes a current obtained from some other point in the transmission line than said line-fault-responsive relaying-means for assisting in protecting the line-section against internal faults while avoiding a line-segregating operation in the event of a transmission-line fault occurring beyond said other point; characterized by said line-fault-responsive relaying-means comprising a current-limiting means so coupled to the line at the relaying point as to respond, in some measure, to a line-current at the relaying point so as to derive an electrical quantity having, at times, a somewhat flat-topped wave-form, a high-frequency transmitter at said other point in the transmission line, an attuned high-frequency receiver at said relaying point, and transmitter-controlling means at said other point; said transmitter-controlling means including a current-limiting means so coupled to the line at said other point as to respond, in some measure, to a line-current at said other point so as to derive an electrical quantity having, at times, a somewhat flat-topped wave-form, means responsive, in some measure, to said electrical quantity at said other point and so coupled to the transmitter as to effect some measure of control thereover, said receiver at the relaying point including a current-limiting means for producing an electrical quantity having, at times, a somewhat flat-topped wave-form in response, in some measure, to the electrical quantity at said other point, and electro-responsive means at the relaying point for responding, in some measure, to some function of the relative phases of the two electrical quantities at said relaying point, to effect a predetermined control over the line-segregating circuit-interrupting means.

11. The combination, with a polyphase transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means including communicating-channel means for obtaining a current from some other point in the transmission line than said line-fault-responsive relaying-means for assisting in protecting the line-section against internal faults while avoiding a line-segregating operation in the event of a transmission-line fault occurring beyond said other point; characterized by said communicating-channel means including a phase-sequence means so coupled to the line at the relaying point as to respond, in some measure, to a plurality of phase-sequence components of the polyphase line-current in such proportions and combinations as to develop a single-phase electrical quantity having an approximation toward a constant predetermined magnitude for any one of a number of approximately equally severe different possible faults or fault-combinations, a similar phase-sequence means similarly responsive to a polyphase line-current at said other point in the transmission line, a normally non-transmitting high-frequency transmitter at said other point, an attuned high-frequency receiver at said relaying point, transmitter-controlling means at said other point for starting said transmitter in response, in some measure, to a predetermined magnitude of said single-phase electrical quantity at said other point and for controlling said transmitter in time-phase response, in some measure, to the alternations of said single-phase electrical quantity at said other point, means associated with the phase-sequence means at the relaying point for deriving a first set of wave-pulsations of approximately constant magnitude in time-phase response, in some measure, to the alternations of the aforesaid single-phase electrical quantity at the relaying point for all different severities of line-faults or line-fault conditions within a predetermined range, means associated with said receiver at the relaying point for deriving a second set of wave pulsations of approximately constant magnitude in time-phase response, in some measure, to the alternations of the aforesaid single-phase electrical quantity at said other point for all different severities of line-faults or line-fault conditions within a predetermined range, and electro-responsive means comparatively responsive, in some measure, to both of said sets of wave-pulsations for effecting a predetermined control over the line-segregating circuit-interrupting means.

12. The combination, with a polyphase transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault responsive relaying-means including communicating-channel means for obtaining a current from some other point in the transmission line than said line-fault-responsive relaying-means for assisting in protecting the line-section against internal faults while avoiding a line-segregating operation in the event of a transmission-line fault occurring beyond said other point; characterized by said communicating-channel means including a phase-sequence means so coupled to the line at the relaying point as to respond, in some measure, to a plurality of phase-sequence components of the polyphase line-current in such proportions and combinations as to develop a single-phase electrical quantity having an approximation toward a constant predetermined magnitude for any one of a number of approximately equally severe different possible faults or fault-combinations, a similar phase-sequence means similarly responsive to a polyphase line-current at said other point in the transmission line, a high-frequency transmitter at said other point, an attuned high-frequency receiver at said relaying point, transmitter-controlling means at said other point for controlling said transmitter in time-phase response, in some measure, to the alternations of said single-phase electrical quantity at said other point, means associated with the phase-sequence means at the relaying point for deriving a first set of wave-pulsations of approximately constant magnitude in time-phase response, in some measure, to the alternations of the aforesaid single-phase electrical quantity at the relaying point for all different severities of line-faults or line-fault conditions within a predetermined range, means associated with said receiver at the relaying point for deriving a second set of wave pulsations of approximately constant magnitude in time-phase response, in some measure, to the alternations of the aforesaid single-phase electrical quantity at said other point for all different severities of line-faults or line-fault conditions within a predetermined range, and electro-responsive means comparatively responsive, in some measure, to both of said sets of wave-pulsations for effecting a predetermined control over the line-segregating circuit-interrupting means.

13. The combination, with a polyphase transmission-line section to be protected, and line-segregating circuit-interrupting means for disconnecting the line from other apparatus, of line-fault-responsive relaying-means for actuating said line-segregating circuit-interrupting means so as to effect a disconnecting operation, said line-fault-responsive relaying-means including communicating-channel means for obtaining a current from some other point in the transmission line than said line-fault-responsive relaying-means for assisting in protecting the line-section against internal faults while avoiding a line-segregating operation in the event of a transmission-line fault occurring beyond said other point; characterized by said communicating-channel means including a phase-sequence means so coupled to the line at the relaying point as to respond, in some measure, to a plurality of phase-sequence components of the polyphase line-current in such proportions and combinations as to develop a single-phase electrical quantity having an approximation toward a constant predetermined magnitude for any one of a number of approximately equally severe different possible faults or fault-combinations, a similar phase-sequence means similarly responsive to a polyphase line-current at said other point in the transmission line, a high-frequency transmitter at said other point, an attuned high-frequency receiver at said relaying point, transmitter-controlling means at said other point for controlling said transmitter in time-phase response, in some measure, to the alternations of said single-phase electrical quantity at said other point, means associated with the phase-sequence means at the relaying point for deriving a first set of wave-pulsations of approximately constant magnitude in time-phase response, in some measure, to the alternations of the aforesaid single-phase electrical quantity at the relaying point for all different severities of line-faults or line-fault conditions within a predetermined range, means associated with said receiver at the relaying point for deriving a second set of wave-pulsations of approximately constant magnitude in time-phase response, in some measure, to the alternations of the aforesaid single-phase electrical quantity at said other point for all different severities of line-faults or line-fault conditions within a predetermined range, and electro-responsive means responsive, in some measure, to some function of the relative phases of said two sets of wave-pulsations for effecting a predetermined control over the line-segregating circuit-interrupting means.

14. The combination, with a polyphase transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means including communicating-channel means for obtaining a current from some other point in the transmission line than said line-fault-responsive relaying-means for assisting in protecting the line-section against internal faults while avoiding a line-segregating operation in the event of a transmission-line fault occurring beyond said other point; characterized by said communicating-channel means including a phase-sequence means so coupled to the line at the relaying point as to respond, in some measure, to a plurality of phase-sequence components of the polyphase line-current in such proportions and combinations as to develop a single-phase electrical quantity having an approximation toward a constant predetermined magnitude for any one of a number of approximately equally severe different possible faults or fault-combinations, a similar phase-sequence means similarly responsive to a polyphase line-current at said other point in the transmission line, a current-limiting means associated with each phase-sequence means for deriving a set of wave-pulsations of approximately constant magnitude in time-phase response, in some measure, to the alternations of the single-phase electrical quantity of its associated phase-sequence means, a high-frequency transmitter at the aforesaid other point in the transmission line, an attuned high-frequency receiver at said relaying point, transmitter-controlling means at said other point for controlling said transmitter in time-phase response, in some measure, to the output of the current-limiting means at said other point, means associated with said receiver at the relaying point for deriving another set of wave-pulsations of approximately constant magnitude in time-phase response, in some measure, to the set of wave-pulsations at said other point, and electro-responsive means comparatively responsive, in some measure, to both of said sets of wave-pulsations at the relaying point for effecting a predetermined control over the line-segregating circuit-interrupting means.

15. The combination, with a polyphase transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means including communicating-channel means for obtaining a current from some other point in the transmission line than said line-fault-responsive relaying-means for assisting in protecting the line-section against internal faults while avoiding a line-segregating operation in the event of a transmission-line fault occurring beyond said other point; characterized by said communicating-channel means including a phase-sequence means so coupled to the line at the relaying point as to respond, in some measure, to a plurality of phase-sequence components of the polyphase line-current in such proportions and combinations as to develop a single-phase electrical quantity having an approximation toward a constant predetermined magnitude for any one of a number of approximately equally sever different possible faults or fault-combinations, a similar phase-sequence means similarly responsive to a polyphase line-current at said other point in the transmission line, a current-limiting means associated with each phase-sequence means for deriving a set of wave-pulsations of approximately constant magnitude in time phase response, in some measure, to the alternations of the single-phase electrical quantity of its associated phase-sequence means, a high-frequency transmitter at the aforesaid other point in the transmission line, an attuned high-frequency receiver at said relaying point, transmitter-controlling means at said other point for controlling said transmitter in time-phase response, in some measure, to the output of the current-limiting means at said other point, means associated with said receiver at the relaying point for deriving another set of wave-pulsations of approximately constant magnitude in time-phase response, in some measure, to the set of wave-pulsations at said other point, and electro-responsive means responsive, in some measure, to some function of the relative phases of said two sets of wave-pulsations at the relaying point for effecting a predetermined control over the line-segregating circuit-interrupting means.

16. The combination, with a three-phase transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means including communicating-channel means for obtaining a current from some other point in the transmission line than said line-fault-responsive relaying-means for assisting in protecting the line-section against internal faults while avoiding a line-segregating operation in the event of a transmission-line fault occurring beyond said other point; characterized by said communicating-channel means including a phase-sequence means so coupled to the line at the relaying point as to derive a single-phase electrical quantity in response, in some measure, to both the positive-sequence and zero-sequence components of a three-phase line-current at said relaying point, a similar phase-sequence means similarly responsive to a three-phase line-current at said other point in the transmisison line, a normally non-transmitting high-frequency transmitter at said other point, an attuned high-frequency receiver at said relaying point, transmitter-controlling means at said other point for starting said transmitted in response, in some measure, to a predetermined magnitude of the single-phase electrical quantity at said other point and for controlling said transmitter in time-phase response, in some measure, to the alternations of said single-phase electrical quantity at said other point, means associated with the phase-sequence means at the relaying point for deriving a first set of wave-pulsations of approximately constant magnitude in time-phase response, in some measure, to the alternations of the aforesaid single-phase electrical quantity at the relaying point for all different severities of line-faults or line-fault conditions within a predetermined range, means associated with said receiver at the relaying point for deriving a second set of wave-pulsations of approximately constant magnitude in time-phase response, in some measure, to the alternations of the aforesaid single-phase electrical quantity at said other point for all different severities of line-faults or line-fault conditions within a predetermined range, and electro-responsive means comparatively responsive, in some measure, to both of said sets of wave-pulsations for effecting a predetermined control over the line-segregating circuit-interrupting means.

17. The combination, with a three-phase transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means including communicating-channel means for obtaining a current from some other point in the transmission line than said line-fault-responsive relaying-means for assisting in protecting the line-section against internal faults while avoiding a line-segregating operation in the event of a transmission-line fault occurring beyond said other point; characterized by said communicating-channel means including a phase-sequence means so coupled to the line at the relaying point as to derive a single-phase electrical quantity in response, in some measure, to both the positive-sequence and zero-sequence components of a three-phase line-current at said relaying point, a similar phase-sequence means similarly responsive to a three-phase line-current at said other point in the transmission line, a high-frequency transmitter at said other point, an attuned high-frequency receiver at said relaying point, transmitter-controlling means at said other point for controlling said transmitter in time-phase response, in some measure, to the alternations of the single-phase electrical quantity at said other point, means associated with the phase-sequence means at the relaying point for deriving a first set of wave-pulsations of approximately constant magnitude in time-phase response, in some measure, to the alternations of the aforesaid single-phase electrical quantity at the relaying point for all different severities of line-faults or line-fault conditions within a predetermined range, means associated with said receiver at the relaying point for deriving a second set of wave-pulsations of approximately constant magnitude in time-phase response, in some measure, to the alternations of the aforesaid single-phase electrical quantity at said other point for all different severities of line-faults or line-fault conditions within a predetermined range, and electro-responsive means comparatively responsive, in some measure, to both of said sets of wave-pulsations for effecting a predetermined control over the line-segregating circuit-interrupting means.

18. The combination, with a three-phase transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means including communicating-channel means for obtaining a current from some other point in the transmission line than said line-fault-responsive relaying means for assisting in protecting the line-section against internal faults while avoiding a line-segregating operation in the event of a transmission-line fault occurring beyond said other point; characterized by said communicating-channel means including a phase-sequence means so coupled to the line at the relaying point as to derive a single-phase electrical quantity in response, in some measure, to both the positive-sequence and zero-sequence components of a three-phase line-current at said relaying point, a similar phase-sequence means similarly responsive to a three-phase line-current at said other point in the transmission line, a high-frequency transmitter at said other point, an attuned high-frequency receiver at said relaying point, transmitter-controlling means at said other point for controlling said transmitter in time-phase response, in some measure, to the alternations of the single-phase electrical quantity at said other point, means associated with the phase-sequence means at the relaying point for deriving a first set of wave-pulsations of approximately constant magnitude in time-phase response, in some measure, to the alternations of the aforesaid single-phase electrical quantity at the relaying point for all different severities of line-faults or line-fault conditions within a predetermined range, means associated with said receiver at the relaying point for deriving a second set of wave-pulsations of approximately constant magnitude in time-phase response, in some measure, to the alternations of the aforesaid single-phase electrical quantity at said other point for all different severities of line-faults or line-fault conditions within a predetermined range, and electro-responsive means responsive, in some measure, to some function of the relative phases of said two sets of wave-pulsations for effecting a predetermined control over the line-segregating circuit-interrupting means.

19. The combination, with a three-phase transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means including communicating-channel means for obtaining a current from some other point in the transmission line than said line-fault-responsive relaying-means for assisting in protecting the line-section against internal faults while avoiding a line-segregating operation in the event of a transmission-line fault occurring beyond said other point; characterized by said communicating-channel means including a phase-sequence means so coupled to the line at the relaying point as to derive a single-phase electrical quantity in response, in some measure, to both the positive-sequence and zero-sequence components of a three-phase line-current at said relaying point, a similar phase-sequence means similarly responsive to a three-phase line-current at said other point in the transmission line, a current-limiting means associated with each phase-sequence means for deriving a set of wave-pulsations of approximately constant magnitude in time-phase response, in some measure, to the alternations of the single-phase electrical quantity of its associated phase-sequence means, a high-frequency transmitter at the aforesaid other point in the transmission line, an attuned high-frequency receiver at said relaying point, transmitter-controlling means at said other point for controlling said transmitter in time-phase response, in some measure, to the output of the current-limiting means at said other point, means associated with said receiver at the relaying point for deriving another set of wave-pulsations of approximately constant magnitude in time-phase response, in some measure, to the set of wave-pulsations at said other point, and electro-responsive means comparatively responsive, in some measure, to both of said sets of wave-pulsations at the relaying point for effecting a predetermined control over the line-segregating circuit-interrupting means.

20. The combination, with a three-phase transmission-line section to be protected, and line-segregating circuit-interrupting means for disconnecting the line from other apparatus, of line-fault-responsive relaying means for actuating said line-segregating circuit-interrupting means so as to effect a disconnecting operation; said line-fault-responsive relaying-means including communicating-channel means for obtaining a current from some other point in the transmission line than said line-fault-responsive relaying-means for assisting in protecting the line-section against internal faults while avoiding a line-segregating operation in the event of a transmission-line fault occurring beyond said other point; characterized by said communicating channel means including a phase-sequence means so coupled to the line at the relaying point as to derive a single-phase electrical quantity in response, in some measure, to both the positive-sequence and zero-sequence components of a three-phase line-current at said relaying point, a similar phase-sequence means similarly responsive to a three-phase line-current at said other point in the transmission line, a current-limiting means associated with each phase-sequence means for deriving a set of wave-pulsations of approximately constant magnitude in time-phase response, in some measure, to the alternations of the single-phase electrical quantity of its associated phase-sequence means, a high-frequency transmitter at the aforesaid other point in the transmission line, an attuned high-frequency receiver at said relaying point, transmitter-controlling means at said other point for controlling said transmitter in time-phase response, in some measure, to the output of the current-limiting means at said other point, means associated with said receiver at the relaying point for deriving another set of wave-pulsations of approximately constant magnitude in time-phase response, in some measure, to the set of wave-pulsations at said other point, and electro-responsive means responsive, in some measure, to some function of the relative phases of said two sets of wave-pulsations at the relaying point for effecting a predetermined control over the line-segregating circuit-interrupting means.

21. The combination, with an alternating-current transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault responsive relaying-means being of a type which utilizes a current obtained from some other point in the transmission line than said line-fault-responsive relaying-means for assisting in protecting the line-section against internal faults while avoiding a line-segregating operation in the event of a transmission-line fault occurring beyond said other point; characterized by said line-fault-responsive relaying-means comprising a current-limiting means so coupled to the line at the relaying point as to respond, in some measure, to a line current at the relaying point so as to derive an electrical quantity having, at times, a somewhat flat-topped wave-form, a high-frequency transmitter at said other point in the transmission line, an attuned high-frequency receiver at said relaying point, and transmitter-controlling means at said other point; said transmitter-controlling means including a current-limiting means so coupled to the line at said other point as to respond, in some measure, to a line-current at said other point so as to derive an electrical quantity having, at times, a somewhat flat-topped wave-form, means responsive, in some measure, to said electrical quantity at said other point and so coupled to the transmitter as to effect some measure of control thereover, said receiver at the relaying point including a current-limiting means for producing an electrical quantity having, at times, a somewhat flat-topped wave-form in response, in some measure, to the electrical quantity at said other point, a polarized relay at the relaying point for exercising a predetermined control over the line-segregating circuit-interrupting means, said polarized relay having an operating-circuit and a restraining-circuit, a separate rectifier-means for energizing each of the circuits of the polarized relay, electric-circuit means for energizing the operating-circuit rectifier-means in differential response, in some measure, to both of said electrical quantities at the relaying point, and electric-circuit means for energizing the restraining-circuit rectifier-means in response, in some measure, to at least one of said electrical quantities at the relaying point, said operating-circuit having a larger number of effective winding-turns than said restraining-circuit.

22. The combination, with a polyphase transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means including communicating-channel means for obtaining a current from some other point in the transmission line than said line-fault-responsive relaying-means for assisting in protecting the line-section against internal faults while avoiding a line-segregating operation in the event of a transmission-line fault occurring beyond said other point; characterized by said communicating-channel means including a phase-sequence means so coupled to the line at the relaying point as to respond, in some measure, to a plurality of phase-sequence components of the polyphase line-current in such proportions and combinations as to develop a single-phase electrical quantity having an approximation toward a constant predetermined magnitude for any one of a number of approximately equally severe different possible faults or fault-combinations, a similar phase-sequence means similarly responsive to a polyphase line-current at said other point in the transmission line, a high-frequency transmitter at said other point, an attuned high-frequency receiver at said relaying point, transmitter-controlling means at said other point for controlling said transmitter in time-phase response, in some measure, to the alternations of said single-phase electrical quantity at said other point, means associated with the phase-sequence means at the relaying point for deriving a first set of wave-pulsations of approximately constant magnitude in time-phase response, in some measure, to the alternations of the aforesaid single-phase electrical quantity at the relaying point for all different severetities of line-faults or line-fault conditions within a predetermined range, means associated with said receiver at the relaying point for deriving a second set of wave-pulsations of approximately constant magnitude in time-phase response, in some measure, to the alternations of the aforesaid single-phase electrical quantity at said other point for all different severtities of line-faults or line-fault conditions within a predetermined range, a polarized relay at the relaying point for exercising a predetermined control over the line-segregating circuit-interrupting means, said polarized relay having an operating-circuit and a restraining-circuit, a separate rectifier-means for energizing each of the circuits of the polarized relay, electric-circuit means for energizing the operating-circuit rectifier-means in differential response, in some measure, to both of said sets of wave-pulsations, and electric-circuit means for energizing the restraining-circuit rectifier-means in response, in some measure, to at least one of said sets of wave-pulsations.

23. The combination, with a polyphase transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means including communicating-channel means for obtaining a current from some other point in the transmission line than said line-fault-responsive relaying-means for assisting in protecting the line-section against internal faults while avoiding a line-segregating operation in the event of a transmission-line fault occurring beyond said other point; characterized by said communicating-channel means including a phase-sequence means so coupled to the line at the relaying point as to respond, in some measure to a plurality of phase-sequence components of the polyphase line-current in such proportions and combinations as to develop a single-phase electrical quantity having an approximation toward a constant predetermined magnitude for any one of a number of approximately equally severe different possible faults or fault-combinations, a similar phase-sequence means similarly responsive to a polyphase line-current at said other point in the transmission line, a current-limiting means associated with each phase-sequence means for deriving a set of wave-pulsations of approximately constant magnitude in time-phase response, in some measure, to the alternations of the single-phase electrical quantity of its associated phase-sequence means, a high-frequency transmitter at the aforesaid other point in the transmission line, an attuned high-frequency receiver at said relaying point, transmitter-controlling means at said other point for controlling said transmitter in time-phase response, in some measure, to the output of the current-limiting means at said other point, means associated with said receiver at the relaying point for deriving another set of wave-pulsations of approximately constant magnitude in time-phase response, in some measure, to the set of wave-pulsations at said other point, a polarized relay at the relaying point for exercising a predetermined control over the line-segregating circuit-interrupting means, said polarized relay having an operating-circuit and a restraining-circuit, a separate rectifier-means for energizing each of the circuits of the polarized relay, electric-circuit means for energizing the operating-circuit rectifier-means in differential response, in some measure, to both of said sets of wave-pulsations at the relaying point, and electric-circuit means for energizing the restraining-circuit rectifier-means in response, in some measure, to at least one of said sets of wave-pulsations at the relaying point.

24. The combination, with a three-phase transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means including communicating-channel means for obtaining a current from some other point in the transmission line than said line-fault-responsive relaying-means for assisting in protecting the line-section against internal faults while avoiding a line-segregating operation in the event of a transmission-line fault occurring beyond said other point; characterized by said communicating-channel means including a phase-sequence means so coupled to the line at the relaying point as to derive a single-phase electrical quantity in response, in some measure, to both the positive-sequence and zero-sequence components of a three-phase line-current at said relaying point, a similar phase-sequence means similarly responsive to a three-phase line-current at said other point in the transmission line, a high-frequency transmitter at said other point, an attuned high-frequency receiver at said relaying point, transmitter-controlling means at said other point for controlling said transmitter in time-phase response, in some measure, to the alternations of the single-phase electrical quantity at said other point, means associated with the phase-sequence means at the relaying point for deriving a first set of wave-pulsations of approximately constant magnitude in time-phase response, in some measure, to the alternations of the aforesaid single-phase electrical quantity at the relaying point for all different severities of line-faults or line-fault conditions within a predetermined range, means associated with said receiver at the relaying point for deriving a second set of wave-pulsations of approximately constant magnitude in time-phase response, in some measure, to the alternations of the aforesaid single-phase electrical quantity at said other point for all different severities of line-faults or line-fault conditions within a predetermined range, a polarized relay at the relaying point for exercising a predetermined control over the line-segregating circuit-interrupting means, said polarized relay having an operating-circuit and a restraining-circuit, a separate rectifier-means for energizing each of the circuits of the polarized relay, electric-circuit means for energizing the operating-circuit rectifier-means in differential response, in some measure, to both of said sets of wave-pulsations, and electric-circuit means for energizing the restraining-circuit rectifier-means in response, in some measure, to at least one of said sets of wave-pulsations.

25. The combination, with a three-phase transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means including communicating-channel means for obtaining a current from some other point in the transmission line than said line-fault-responsive relaying-means for assisting in protecting the line-section against internal faults while avoiding a line-segregating operation in the event of a transmission-line fault occurring beyond said other point; characterized by said communicating-channel means including a phase-sequence means so coupled to the line at the relaying point as to derive a single-phase electrical quantity in response, in some measure, to both the positive-sequence and zero-sequence components of a three-phase line-current at said relaying point, a similar phase-sequence means similarly responsive to a three-phase line-current at said other point in the transmission line, a current-limiting means associated with each phase-sequence means for deriving a set of wave-pulsations of approximately constant magnitude in time-phase response, in some measure, to the alternations of the single-phase electrical quantity of its associated phase-sequence means, a high-frequency transmitter at the aforesaid other point in the transmission line, an attuned high-frequency receiver at said relaying point, transmitter-controlling means at said other point for controlling said transmitter in time-phase response, in some measure, to the output of the current-limiting means at said other point, means associated with said receiver at the relaying point for deriving another set of wave-pulsations of approximately constant magnitude in time-phase response, in some measure, to the set of wave-pulsations at said other point, a polarized relay at the relaying point for exercising a predetermined control over the line-segregating circuit-interrupting means, said polarized relay having an operating-circuit and a restraining-circuit, a separate rectifier-means for energizing each of the circuits of the polarized relay, electric-circuit means for energizing the operating-circuit rectifier-means in differential response, in some measure, to both of said sets of wave-pulsations at the relaying point, and electric-circuit means for energizing the restraining-circuit rectifier-means in response, in some measure, to at least one of said sets of wave-pulsations at the relaying point.

26. The combination, with an alternating-current electrical apparatus to be protected, said apparatus having a first terminal where current normally enters the apparatus, and a second terminal where current normally leaves the apparatus, under predetermined power-flow conditions, of fault-responsive relaying-means, means responsive sensitively to current of fault-magnitude in one of said terminals for initiating the production of a pulsating restraining force and for causing the pulsations of said restraining force to be in time-phase response, in some manner, to the alternations in the current in its associated terminal, means responsive less sensitively to current of fault-magnitude in the other terminal for producing a pulsating operating force in time-phase response, in some manner, to the alternations in the current in its associated terminal, the pulsations of said restraining and operating forces being approximately in phase with each other when fault-current is flowing through the protected apparatus to some faulted point outside of the apparatus, and relay-operating means effective to effect a predetermined relay-response in response to said operating force when the pulsations of the two forces are in a predetermined manner out of phase with each other.

27. The invention as defined in claim 26, characterized by the fact that both of the pulsating forces to which said relay-operating means is responsive are of an approximately limited magnitude not sensitively variable in response to the magnitudes of the currents in the respective terminals of the protected apparatus.

28. The combination, with an alternating-current electrical apparatus to be protected, said apparatus having a first terminal where current normally enters the apparatus, and a second terminal where current normally leaves the apparatus, under predetermined power-flow conditions, of fault-responsive relaying-means, means responsive sensitively to current of fault magnitude in one of said terminals for initiating the production of a first derived alternating-current relaying-quantity in time-phase response, in some manner, to the alternations in the current in its associated terminal, means responsive less sensitively to current of fault-magnitude in the other terminal for producing a second derived alternating-current relaying-quantity in time-phase response, in some manner, to the alternations in the current in its associated terminal, said derived alternating-current relaying-quantities being approximately in phase with each other when fault-current is flowing through the protected apparatus to some faulted point outside of the apparatus, and relay-operating means effective to effect a predetermined relay-responsive when the two derived alternating-current relaying-quantities are in a predetermined manner out of phase with each other.

29. The invention as defined in claim 28, characterized by the fact that both of said derived alternating-current relaying-quantities are of an approximately limited magnitude not sensitively variable in response to the magnitudes of the currents in the respective terminals of the protected apparatus.

30. The combination, with an alternating-current electrical apparatus to be protected, said apparatus having a first terminal where current normally enters the apparatus and a second terminal where current normally leaves the apparatus, under predetermined power-flow conditions, of a fault-responsive relaying-means having an operating-coil, means for deriving a first relaying-voltage having phases of pulsations predeterminedly responsive to the phase of predetermined currents, at least including currents of fault-magnitude, in said first terminal, means for deriving a second relaying-voltage having phases of pulsations predeterminedly responsive to the phase of predetermined currents, at least including currents of fault-magnitude, in said second terminal, a first circuit-means connected across the terminals of said operating-coil to energize the same in response to said first relaying-voltage, a second circuit-means also connected across the terminals of said operating-coil to energize the same in response to said second relaying-voltage in such polarity and amount that said second circuit-means in effect substantially short-circuits said operating-coil in the event of a "through" fault-current passing through the protected apparatus to an external fault, switching means operatively associated with said second circuit-means for in effect making and breaking the operative connection between said second relaying-voltage and said operating-coil, and means responsive, in some manner, to the amount of current flowing in said second terminal of the protected apparatus for effecting a predetermined control over said switching-means.

31. The combination, with an alternating-current electrical apparatus to be protected, said apparatus having a first terminal where current normally enters the apparatus and a second terminal where current normally leaves the apparatus, under predetermined power-flow conditions, of a fault-responsive relaying-means having an operating-coil, means for deriving a first relaying-voltage having phases of pulsations predeterminedly responsive to the phase of predetermined currents, at least including currents of fault-magnitude, in said first terminal, means for deriving a second relaying-voltage having phases of pulsations predeterminedly responsive to the phase of predetermined currents, at least including currents of fault-magnitude, in said second terminal, a first circuit-means connected across the terminals of said operating-coil to energize the same in response to said first relaying voltage, a second circuit-means also connected across the terminals of said operating-coil to energize the same in response to said second relaying-voltage in such polarity and amount that said second circuit-means in effect substantially short-circuits said operating-coil in the event of a "through" fault-current passing through the protected apparatus to an external fault, switching-means operatively associated with said second circuit-means for in effect making and breaking the operative connection between said second relaying-voltage and said operating-coil, and means responsive to the magnitude of the current in the second terminal of the protected apparatus for in effect causing said operative connection to be broken at times when said second-terminal current is below a predetermined value and for in effect causing said operative connection to be made at times when said second-terminal current is above a predetermined value.

32. The combination, with an alternating-current line-section having terminals at at least two different stations, and line-segregating circuit-interrupting means for disconnecting the line-section from other apparatus, of line-fault-responsive relaying-means for actuating said line-segregating circuit-interrupting means so as to effect a disconnecting operation, the line-fault-responsive relaying-means at a first one of said stations having an operating-coil, means for deriving a first relaying-voltage having phases of pulsations predeterminedly responsive to the phase of predetermined line-currents, at least including currents of fault-magnitude, at said first station, means for deriving a relaying-voltage having phases of pulsations predeterminedly responsive to the phase of predetermined line-currents, at least including currents of fault-magnitude, at a second one of said stations, a first circuit-means connected across the terminals of said operating-coil to energize the same in responsive to said first relaying-voltage, communicating-channel means for making available, at said first station, a second relaying voltage having phases of pulsations predeterminedly responsive to the phase of the relaying-voltage at said second station, said communicating-channel means also including, at said first station, a second circuit-means also connected across the terminals of said operating-coil to energize the same in response to said second relaying-voltage in such polarity and amount that said second circuit-means in effect substantially short-circuits said operating-coil in the event of a "through" fault-current passing through the line-section to an external fault, switching-means operatively associated with said communicating-channel means for in effect making and breaking the operative connection between the relaying-voltage at said second station and the operating-coil at said first station, and means responsive, in some manner, to the amount of line-current flowing in the line-section at said second station for effecting a predetermined control over said switching-means.

33. The combination, with an alternating-current line-section having terminals at at least two different stations, and line-segregating circuit-interrupting means for disconnecting the line-section from other apparatus, of line-fault-responsive relaying-means for actuating said line-segregating circuit-interrupting means so as to effect a disconnecting operation, the line-fault-responsive relaying-means at a first one of said stations having an operating-coil, means for deriving a first relaying-voltage having phases of pulsations predeterminedly responsive to the phase of predetermined line-currents, at least including currents of fault-magnitude, at said first station, means for deriving a relaying-voltage having phases of pulsations predeterminedly responsive to the phase of predetermined line-currents, at least including currents of fault-magnitude, at a second one of said stations, a first circuit-means connected across the terminals of said operating-coil to energize the same in response to said first relaying-voltage, communicating-channel means for making available, at said first station, a second relaying voltage having phases of pulsations predeterminedly responsive to the phase of the relaying-voltage at said second station, said communicating-channel means also including, at said first station, a second circuit-means also connected across the terminals of said operating-coil to energize the same in response to said second relaying-voltage in such polarity and amount that said second circuit-means in effect substantially short-circuits said operating-coil in the event of a "through" fault-current passing through the line-section to an external fault, switching-means operatively associated with said communicating-channel means for in effect making and breaking the operative connection between the relaying-voltage at said second station and the operating-coil at said first station, and means responsive to the magnitude of the line-current at the second station for in effect causing said operative connection to be broken at times when said second-station line-current is below a predetermined value and for in effect causing said operative connection to be made at times when said second-station line-current is above a predetermined value.

MYRON A. BOSTWICK.